(12) United States Patent
Kim

(10) Patent No.: US 6,192,012 B1
(45) Date of Patent: Feb. 20, 2001

(54) METHOD AND APPARATUS FOR RECORDING AND REPRODUCING RECORDING MEDIUM

(75) Inventor: Dae Young Kim, Seoul (KR)

(73) Assignee: LG Electronics Inc., Seoul (KR)

(*) Notice: Under 35 U.S.C. 154(b), the term of this patent shall be extended for 0 days.

(21) Appl. No.: 09/186,337

(22) Filed: Nov. 5, 1998

(30) Foreign Application Priority Data

Nov. 6, 1997 (KR) .................................................. 97-58609

(51) Int. Cl.[7] ...................................................... G11B 5/09
(52) U.S. Cl. ........................................ 369/47; 369/124.14
(58) Field of Search .............................. 369/44.13, 44.25, 369/44.26, 44.29, 44.31, 44.35, 47, 48, 49, 50, 54, 124.01, 124.04, 124.05, 124.13, 124.14, 275.4

(56) References Cited

U.S. PATENT DOCUMENTS 5,508,985 * 4/1996 Fairchild et al. ....................... 369/48
5,615,185 * 3/1997 Horikiri .............................. 369/47 X
5,754,522 * 5/1998 Kobayashi et al. ........... 369/275.4 X

* cited by examiner

Primary Examiner—Paul W. Huber

(57) ABSTRACT

A recording/reproducing method and apparatus for an optical recording medium that is adapted to accurately detect a wobbling signal from an optical recording medium having recording tracks defined by wobbled grooves independently of a driving condition of the optical recording medium. In the method, a wobbling signal is picked up from a wobbled part of the recording medium. A frequency of a wobbling signal being picked up from the wobbled part is detected, and a frequency band of filtering means for detecting the wobbling signal from the picked-up signal is controlled in accordance with the detected frequency.

20 Claims, 7 Drawing Sheets

US 6,192,012 B1

METHOD AND APPARATUS FOR RECORDING AND REPRODUCING RECORDING MEDIUM

BACKGROUND OF THE INVENTION

1. Field of the Invention

This invention relates to a method and apparatus for performing a recording/reproduction of an information on/from an optical recording medium having recording tracks each defined by wobbled grooves.

2. Description of the Related Art

Generally, in a recordable or rewritable optical recording medium, a rotation control information and/or an address information are recorded by means of the wobbled grooves in advance. In other words, a rotation and/or address information are preformatted on the wobbled grooves. An example of the optical recording medium having the wobbled grooves as mentioned above includes a DVD-RAM (digital versatile disc-random access memory) as shown in FIG. 1.

In the DVD-RAM of FIG. 1, there are formed wobbled grooves 10 and lands 12 wobbled alternately with the wobbled grooves 10. The grooves and lands 10 and 12 are used as recording regions. A certain period of wobbling signals are included in a wobbled portion 14 of each groove and land 10 and 12, hereinafter referred to as "wobbled part", that is, in each side of the land and groove 10 and 12. A recording/reproducing apparatus for an optical recording medium generates a rotation control information about the DVD-RAM and a recording clock by means of the wobbling signals. Also, each of the land and groove 10 and 12 is alternated with a identification(ID) region consisting of a pre-pit train 16. The pre-pit train 16 includes an address information for indicating the physical position of the groove and land 10 and 12. The physical positions of all the grooves and lands 10 and 12 are indicated by means of such ID regions, thereby recording an information on all the grooves and lands 10 and 12.

In order to detect the wobbling signal from the optical recording medium having such wobbled lands and grooves 10 and 12, the optical recording/reproducing apparatus makes use of a band pass filter(BPF) having a filtering characteristic corresponding to a frequency band of the wobbling signal. In an optical recording/reproducing apparatus employing such a BPF, the wobbling signals are not detected when a rotation speed of the optical recording medium is different from a reference speed. Also, an optical recording/reproducing apparatus including a BPF having a filtering characteristic corresponding to an optical recording medium in a specified rotation speed mode fails to detect the wobbling signal from the optical recording when it drives an optical recording medium in a different rotation speed mode. In other words, an optical recording/reproducing apparatus can not be used changeably for all optical recording media in various rotation speed modes. Moreover, the optical recording/reproducing apparatus including a BPF having a specified filtering characteristic fails to drive an optical recording medium at a certain of multiple speed because it can not detect the wobbling signal from the optical recording medium when the optical recording medium is driven at a speed different from the reference speed.

SUMMARY OF THE INVENTION

Accordingly, it is an object of the present invention to provide a recording/reproducing method and apparatus for an optical recording medium that is adapted to accurately detect a wobbling signal from an optical recording medium having recording tracks defined by wobbled grooves independently of a driving condition of the optical recording medium.

In order to achieve this and other objects of the invention, a recording/reproducing method for a recording medium according to one aspect of the present invention includes the steps of picking up a wobbling signal from a wobbled part in the recording medium; detecting a frequency of the wobbling signal being picked up from the wobbled part; and controlling a frequency band of filtering means for detecting the wobbling signal in accordance with the detected frequency.

A recording/reproducing apparatus for a recording medium according to another aspect of the present invention includes a pickup for picking up a signal from the recording medium; frequency detecting means for detecting a frequency of a wobbling signal picked up from a wobbled part in the recording medium by the pickup; filtering means for filtering a n output signal of the pickup to detect the wobbling signal; and a filter controller for responding an output signal of the frequency detecting means to control a filtering frequency band of the filtering means.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
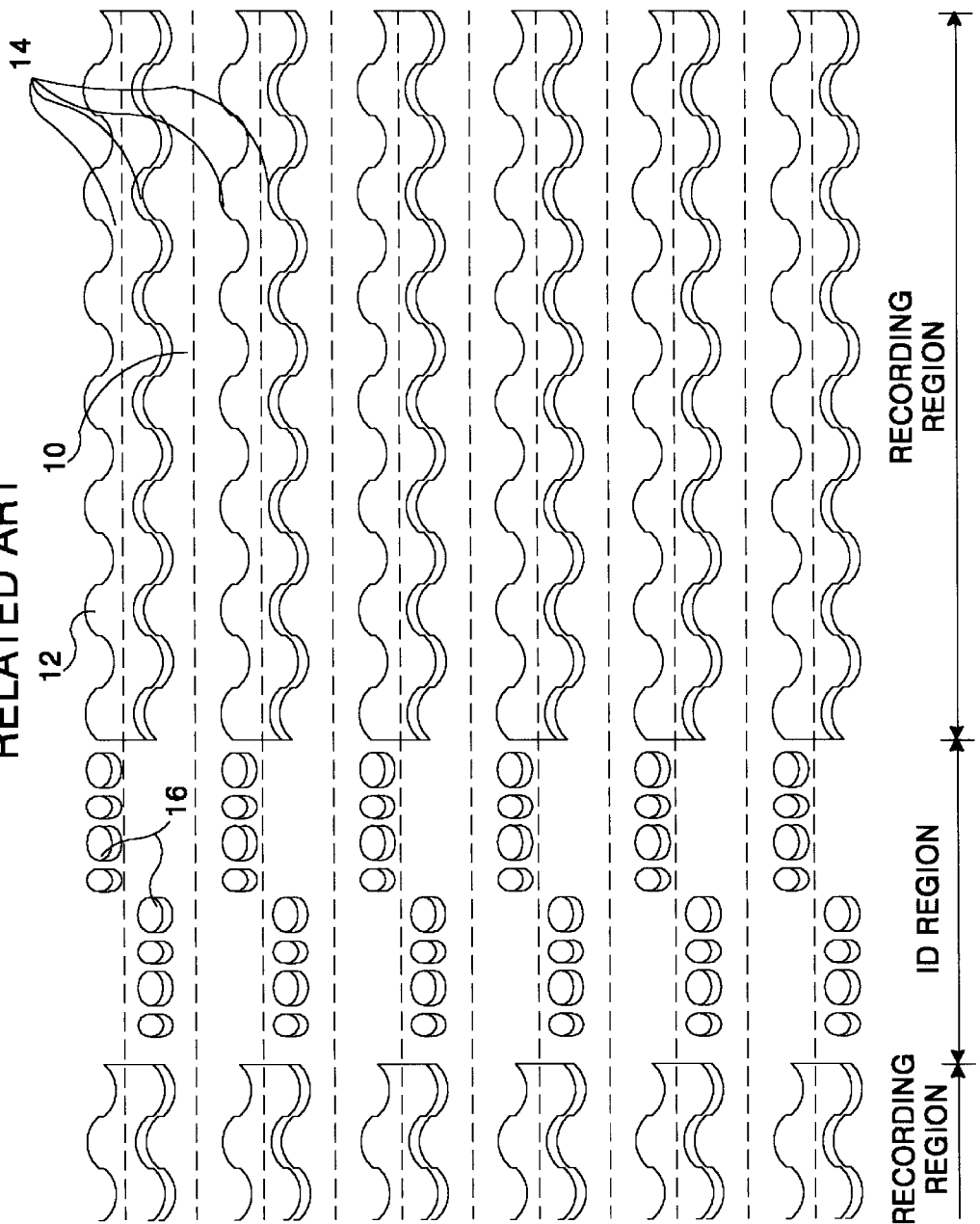
FIG. 1 is a schematic view showing the track structure of a DVD-RAM.
Figure 2:
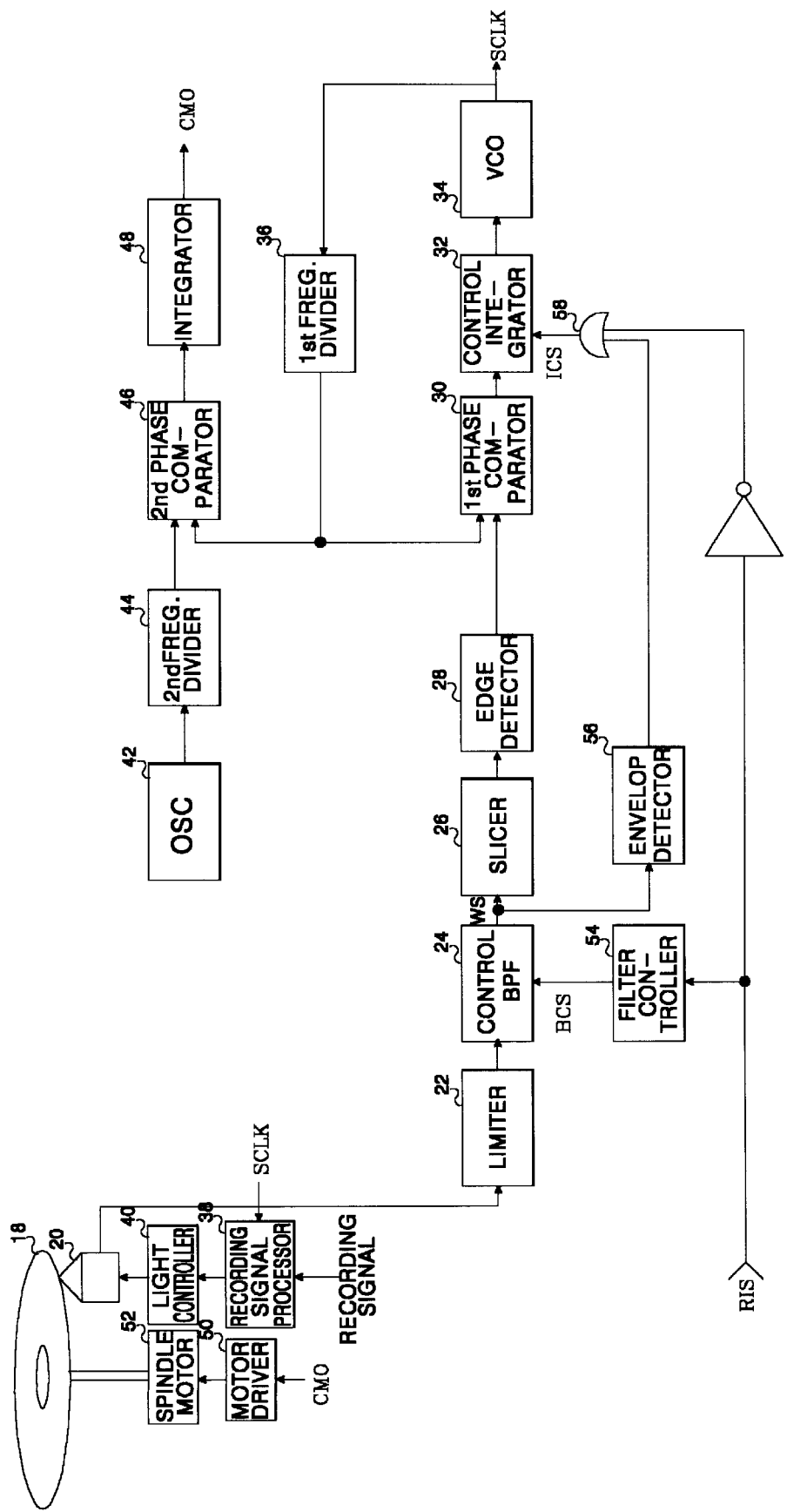
FIG. 2 is a schematic block diagram showing the configuration of a recording apparatus for an optical recording medium according to an embodiment of the present invention.
Figure 3A:
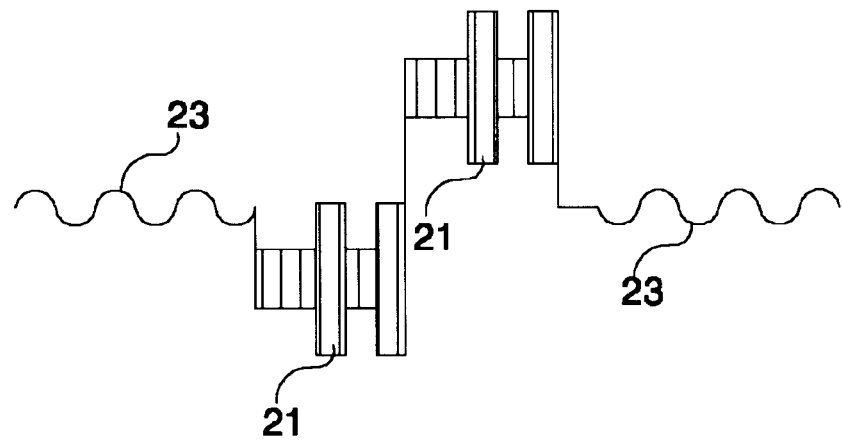
FIGS. 3A and 3B are waveform diagrams of electrical signals output from the pickup in FIG. 2.
Figure 3B:
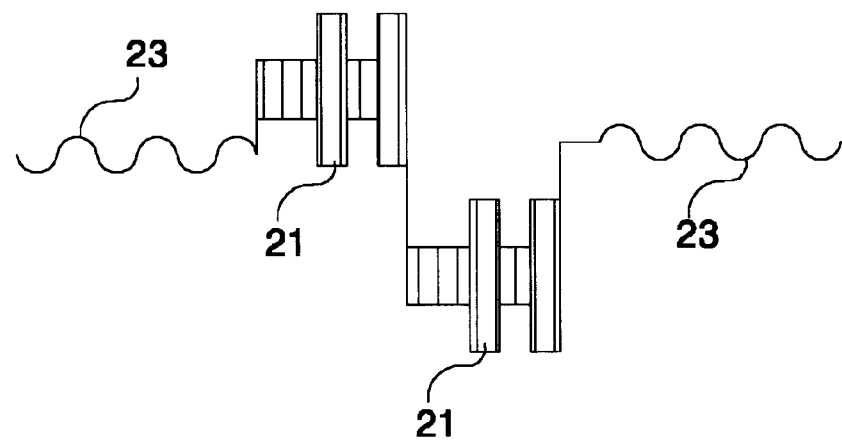
Figure 4:
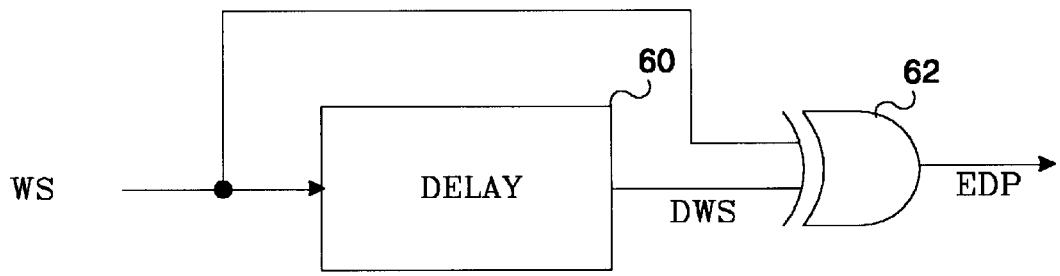
FIG. 4 is a detailed view of the edge detector in FIG. 2.

Referring to FIG. 2, there is shown a recording apparatus for an optical recording medium according to an embodiment of the present invention for recording a user information on an optical disc of land/groove recording system. The recording apparatus includes a limiter 22, a controlling BPF 24, a slicer 26 and an edge detector 28 that are connected to a pickup 20 in series. The pickup irradiates a laser light beam onto an optical disc of the land/groove recording system as shown in FIG. 1, and converts a reflective light quantity reflected by the optical disc 18 into an electrical signal. The electrical signal generated at the pickup 20 has waveforms shown in FIG. 3A and FIG. 3B. FIG. 3A shows an electrical signal generated at the pickup 20 when a light beam is irradiated onto the land track 12, and FIG. 3B shows an electrical signal generated at the pickup 20 when a light beam is irradiated onto the groove track 10. The electrical signal in FIG. 3A has a phase contrary to that in FIG. 3B. In FIGS. 3A and 3B, a pit train signal 21 is distributed at a voltage level higher than or lower than a wobbling signal 23. When a user information is recorded on the land or groove track 12 or 10, the wobbling signal 23 includes an information signal(not shown) having a radio frequency component. Such an electrical signal is level-limited by means of the limiter 22 to thereby eliminate the pit train signal 21. In this case, the output signal of the limiter 22 may include only the wobbling signal 23 or may include an information along with the wobbling signal 23. The controlling BPF 24 eliminates a radio frequency component of information signal that may be included in the output signal of the limiter 22, thereby detecting a wobbling signal distributed at a constant frequency band. The wobbling signal detected by the controlling BPF 24 has a contrary phase in accordance with whether any one of the land track 12 and the groove track 10 is accessed. Then the wobbling signal is level-sliced and logicalized by means of the slicer 26, so that it is waveform-shaped into a rectangular waveform shape. The edge detector 28 detects the rising edge and the falling edge of the waveform-shaped wobbling signal from the slicer 26 and generates an edge detecting pulse in which a specified logic of pulses are positioned at the rising and falling edges of the wobbling signal. To this end, the edge detector 28 can be configured as shown in FIG. 4. The configuration of the edge detector 28 will be explained later.

A first phase comparator 30, a controlling integrator 32 and a voltage controlled oscillator(VCO) 34 is connected to the edge detector 28 in cascade, and a first frequency divider 36 is connected between the VCO 34 and the phase comparator 30. The first phase comparator 30 compares a phase of the edge detecting pulse from the edge detector 28 with that of a clock signal from the first frequency divider 36 and generates a phase error signal having a voltage level changing in accordance with the phase difference. This phase error signal is integrated using the controlling integrator 32. The controlling integrator 32 performs an integration and hold operation in accordance with a logical value of an integration control signal ICS. More specifically, during an envelop interval of the electrical signal, that is, during a time interval when a light beam is positioned at a recording region of the land or groove track, the controlling integrator 32 integrates a phase error signal from the first phase comparator 30 and applies the integrated phase error signal to the VCO 34. Otherwise, during a pit train signal interval of the electrical signal, that is, during a time interval when a light beam is positioned at an ID region of the pit train 16, the controlling integrator 32 holds a phase error signal integrated in the envelop interval and applies the held phase error signal to the VCO 34. Meanwhile, the controlling integrator 32 may be replaced by a conventional integrator without a control line in the case of being applied to a recording apparatus for an optical recording medium for accessing an optical disc having only the land and groove tracks 12 and 10 wobbled without the pre-pit train 16. The VCO 34 responding to the integrated phase error signal from the controlling integrator 32 control an oscillation period in accordance with a voltage level of the integrated phase error signal to generate a channel bit clock SCLK having the same phase as the edge detecting pulse. A frequency of the channel bit clock SCLK can be set to have a value equal to or higher by a predetermined multiple than that of the edge detecting pulse. The channel bit clock SCLK is applied to a recording signal processor 38 to control a recording speed of a user information recorded on the optical disc 18. In other words, the channel bit clock SCLK has a frequency varying in accordance with a rotation speed of the optical disc 18 to maintain a recording density of the optical disc constantly. The recording signal processor 38 converts a user information into a channel bit stream that is a shape required by the optical disc 18, and transfers the channel bit stream to a light controller 40 in conformity to the channel bit clock SCLK from the VCO 34. The light controller 40 intermit a light source included in the pickup 20 in accordance with a logical value of the channel bit stream from the recording signal processor 38, thereby recording a user information on the land or groove tracks 12 and 10 of the optical disc 18. The first frequency divider 36 frequency-divides the channel bit clock SCLK from the VCO 34 by a first predetermined number (e.g., 2) and applies the frequency-divided channel bit clock to the first phase comparator 36.

The recording/reproducing apparatus further includes a second frequency divider 44, a second phase comparator 46, an integrator 48, a motor driver 50 and a spindle motor 52 that are connected to an oscillator in cascade. The oscillator 42 generates an oscillation signal having a constant frequency. This oscillation signal is frequency-divided by a second predetermined number by means of the second frequency divider 44 and applied to the second comparator 46 as a reference signal. The second phase comparator 46 detects a phase difference between the frequency-divided oscillation signal from the second frequency divider 44 and the frequency-divided channel bit clock from the first channel frequency divider 36 and generates a second phase error signal having a voltage corresponding to the phase difference. The second phase error signal is integrated with the integrator 48 and applied to a motor driver 50 as a rotation error signal CMO. Then, the motor driver 50 accelerates or decelerates a rotation speed of a spindle motor 52 in accordance with a voltage level of the rotation error signal CMO from the integrator 48, thereby maintaining a rotation speed of the optical disc 18 constantly.

Figure 6:
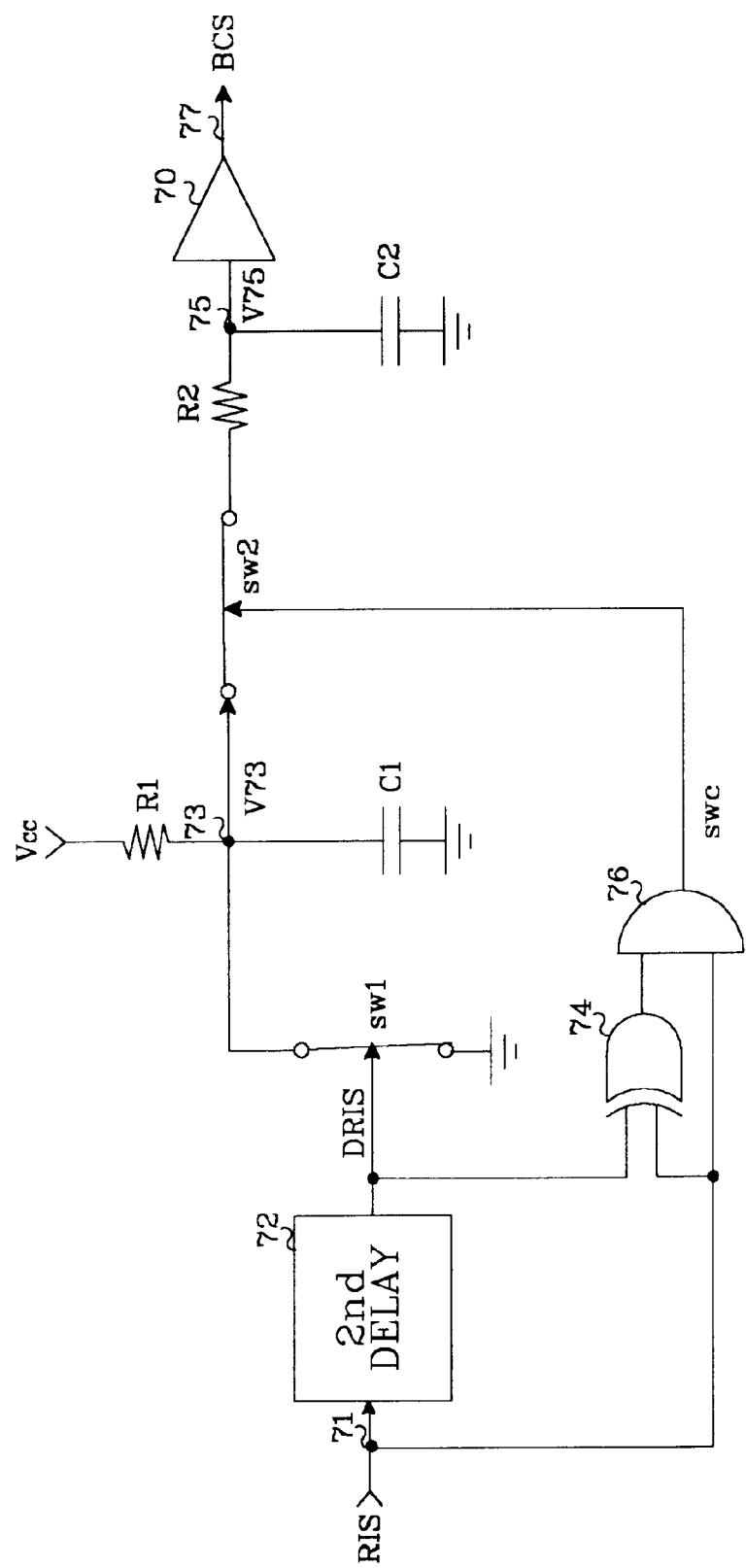
FIG. 6 is a detailed circuit diagram of the filter controller in FIG. 2.

A filter controller 54 responding to a region identification signal RIS is connected to the controlling BPF 24. The filter controller 54 detects a frequency of the region identification signal RIS to generate a band control signal BCS having a voltage level varying depending on the detected frequency. This band control signal BCS has more and more low voltage level as a frequency of the region identification signal RIS becomes higher; while having more and more high voltage level as it becomes lower. The band control signal BCS moves a filtering frequency band of the controlling BPF 24, thereby accurately detecting a wobbling signal WS by means of the controlling BPF 24 even when a rotation speed of the optical disc 18 is departed from a reference speed. The filter controller 54 is configured as shown in FIG. 6 so as to generate the band control signal BCS. The configuration of the filter controller 54 will be explained later. Alternatively, the filter controller 54 may generate the band control signal BCS on a basis of a period of the synchronous pattern signal read out of the optical disc 18 by the pickup 20 or a period of the channel bit clock SCLK generated at the VCO 34. As another alternative, the filter controller 54 may generate the band control signal BCS based on a speed control information from a controller(not shown). The speed control information can be determined by a disc speed mode flag recorded on a specified area of the optical disc or established by a variable speed mode command selected by a user. In this case, the filter controller 54 may include a digital to analog converter. As still another alternative, the controlling BPF 24 can respond to the rotation error signal CMO generated at the integrator 48 to move a filtering frequency band thereof. In other words, the rotation error signal CMO generated at the integrator 48 may applied to the controlling BPF 24 as a band control signal BCS.

Figure 8:
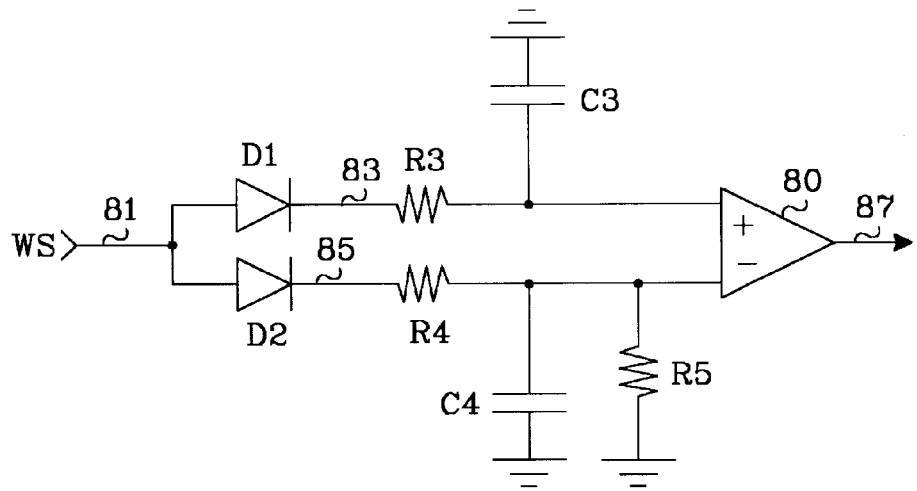
FIG. 8 is a detailed circuit diagram of the envelop detector in FIG. 2.

Furthermore, the recording apparatus includes an inverter INV for the region identification signal RIS, an envelop detector 56 for receiving an output signal of the controlling BPF 56, and an OR gate 58 for receiving an output signal of the envelop detector 56 and an output signal of the inverter INV. The inverter INV inverts the region identification signal RIS and applies the inverted region identification signal RIS to the OR gate 58. The envelop detector 56 detects if the wobbling signal WS exists in the output signal of the controlling BPF 24. If so, the envelop detector 56 generates an envelop detection signal having a high logic. On the other hand, if not, it generates an envelop detection signal having a low logic. This envelop detection signal has a low logic when an ID area of pre-pit train is accessed and when a portion in which a wobbling signal is removed due to a defect in the land and groove tracks 12 and 10 is accessed. The envelop detector 56 can be configured as shown in FIG. 8. The configuration of the envelop detector 56 will be explained later. The OR gate 58 provides an OR operation of the inverted region identification signal from the inverter INV and the envelop detection signal from the envelop detector 56 to generate an integration control signal ICS. This integration control signal ICS maintains a low logic when an ID region of pre-pit train is accessed and when a portion in which a wobbling signal is removed due to a defect in the land and groove tracks 12 and 10 is accessed. The controlling integrator 32 integrates the first phase error signal from the phase comparator 30 with an aid of the integration control signal ICS only when a wobbling signal is detected by the controlling BPF 24. Also, the controlling integrator 32 holds the integrated first phase error signal when an ID region and a portion in which wobbled part 14 in the land and groove tracks 12 and 10 is removed are accessed. Accordingly, the VCO 34 can stabbly generate a recording channel clock even when an ID region is accessed or even when land and groove tracks without any wobbled parts are accessed. As a result, an information recording can be stabbly performed and hence the optical disc can be rotated at a constant speed.

FIG. 4 shows a detailed circuit of the edge detector 28 in FIG. 2. In FIG. 4, the edge detector 28 includes a first delay 60 and a first exclusive OR gate 62, hereinafter referred to as "EOX gate", for commonly receiving the waveform-shaped wobbling signal from the slicer 26 in FIG. 2. The first delay 60 delays the wobbling signal WS by a certain time and applies the delayed wobbling signal DWS to the EOX gate 62. The first EOX gate 62 changes its output logical value in accordance with whether or not a logical value of the wobbling signal WS from the slicer 26 is equal to that of the delayed wobbling signal DWS from the first delay 60. More specifically, the first EOX gate 62 generates a logical value of "0" when logical values of the two input signals are same; while generating a logical value of "1" when they are different. By such an operation, an edge detecting pulse EDP having a width corresponding to a delay amount of the first delay 60 is generated every edge of the wobbling signal WS at the first EOX gate 62. The edge detecting pulse EDP has a double of frequency compared with the wobbling signal WS. Accordingly, the edge detecting pulse EDP has always an identical phase even though a phase of the wobbling signal WS is inverted, that is, even though any one of the land and groove tracks 12 and 10 is accessed. This will become apparent from FIGS. 5A and 5B.

Figure 5A:
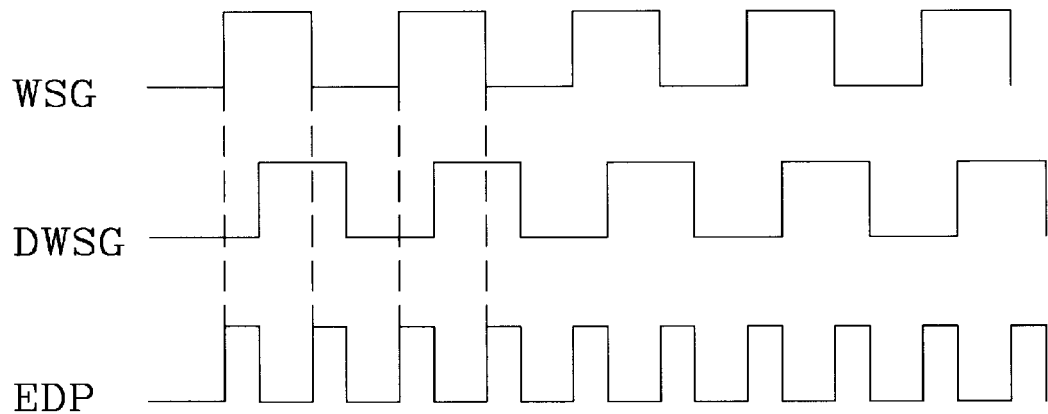
FIG. 5A is input/output waveform diagrams of each part of the edge detector in FIG. 4 when a groove track is accessed.
Figure 5B:
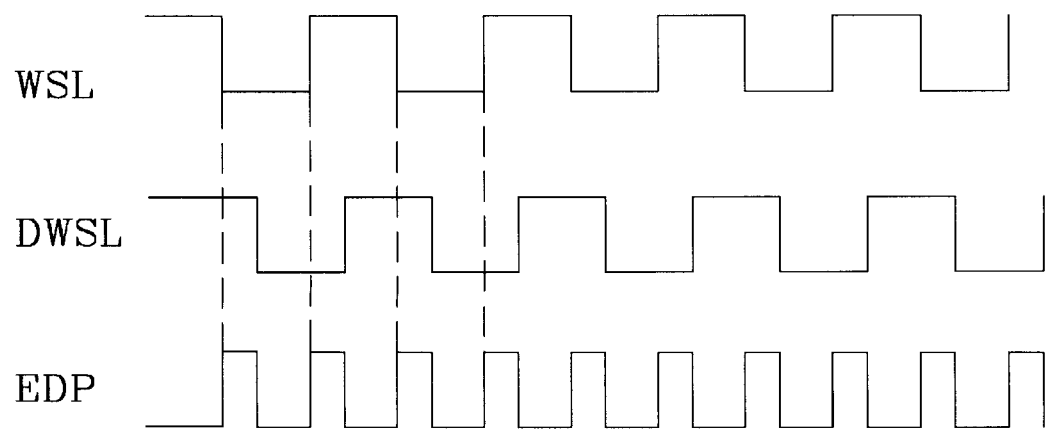
FIG. 5B is input/output waveform diagrams of each part of the edge detector in FIG. 4 when a land track is accessed.

FIG. 5A shows waveforms of a wobbling signal WSG, a delayed wobbling signal DWSG and an edge detecting pulse EDP when the groove track 10 is accessed, and FIG. 5B shows waveforms of a wobbling signal WSL, a delayed wobbling signal DWSL and an edge detecting pulse EDP when the land track 12 is accessed. Referring now to FIGS. 5A and 5B, it is to be noted that the edge detection pulses EDP have the identical phase even when the two wobbling signals WSG and WSL have a contrary phase to each other. Accordingly, the generation of channel bit clock SCLK and the disc rotation control as mentioned above make use of the edge detection pulse EDP having the same phase independently of the land/groove tracks, so that they can be stabbly performed even when any one of the land/groove tracks is accessed.

FIG. 6 shows a detailed circuit of an embodiment of the filter controller 54 in FIG. 2. In FIG. 6, the filter controller 54 detects a length of each recording region with the aid of the region identification signal and generates a band control signal BCS having a voltage level according to the length of recording region. To this end, the filter controller 54 includes a first resistor R1 connected between a supply voltage source VCC and a first node 73, and a first control switch SW1 and a first capacitor C1 connected, in parallel, between the first node 73 and the ground voltage source GND. The first capacitor C1 charges a supply voltage VCC inputted via the first resistor R1 and the first node 73 from the supply voltage source VCC. The first resistor R1 determines a speed at which the supply voltage VCC is charged into the first capacitor C1. A voltage signal charged in the first capacitor C1 emerges at the first node 73. The first control switch SW1 connects the first node 73 to the ground GND when it is turned on, thereby discharging the voltage charged in the first capacitor C1. In other words, the first control switch SW1 has a function of initializing the first capacitor C1 periodically. As a turn-off interval of the first control switch SW1 becomes longer, that is, as a time interval when a recording region is accessed becomes longer, more and more high level of voltage signal V73 is generated at the first node 73.

The filter controller 54 further includes a second control switch SW2 and a second resistor R2 connected, in series, between the first node 73 and a second node 75, a second capacitor C2 connected between the second node 75 and the ground GND, and an amplifier 70 connected between the second node 75 and the output line 77. The second control switch SW2 transfers the voltage signal V73 at the first node 75, via the second resistor R2, to the second node 75 when it is turned on. The second resistor R2 and the second capacitor C2 makes a filtering and holding of the voltage signal V73 at the first node 73 inputted by way of the second control switch SW2. To this end, when the second control switch SW2 is turned on, the capacitor C2 accumulates the voltage signal V73 inputted, via the second control switch SW2, the resistor R2 and the second node 75, from the first node 73 to eliminate a radio frequency component. Also, the capacitor C2 applies the accumulated voltage, via the second node 75, to the amplifier 70 during an interval at which the second control switch SW2 is turned off. The amplifier 70 amplifies a voltage signal at the second node 75 and applies the amplified voltage signal to the control BPF 24 shown in FIG. 2 as the band control signal BCS. Then, as a voltage level of the band control signal BCS becomes lower, the control BPF 24 set a center frequency of the filtering frequency band to have more and more high value, and it detects only an electrical signal having the set filtering frequency band. As a result, the control BPF 24 can accurately detect a wobbling signal even when a frequency of the wobbling signal changes, that is, even when a rotation speed of the optical disc 18 changes.

Figure 7:
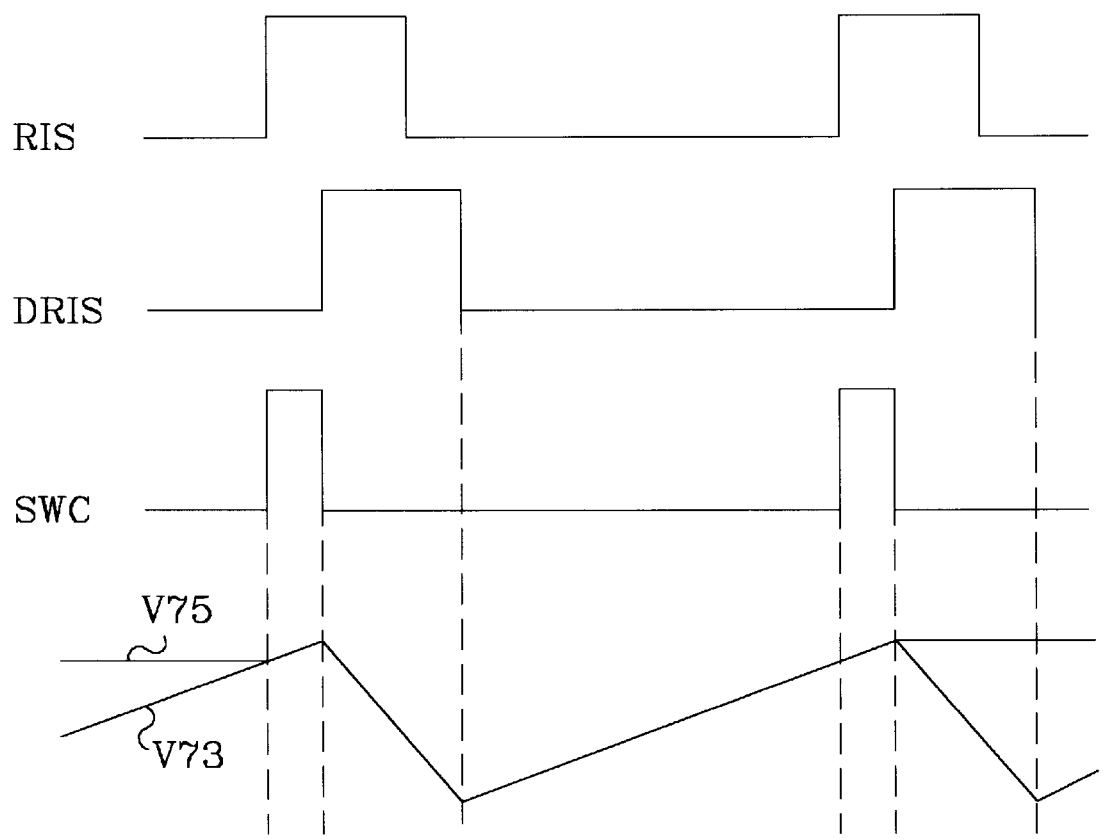
FIG. 7 is input/output waveform diagrams of each part of the filter controller shown in FIG. 6.

Moreover, the filter controller 54 includes a second delay 72, a second EOX gate 74 and an AND gate 76 for commonly receiving the region identification signal RIS from an input line 71. As shown in FIG. 7, the region identification signal RIS maintains a high logic during an interval when an ID region is accessed; while maintaining a low logic during an interval when a recording region consisting of the land and groove tracks 12 and 10 is accessed. The second delay 72 delays the region identification signal RIS during a predetermined interval and applies the delayed region identification signal DRIS to the first control switch SW1 and the second EOX gate 74. The first control switch SW1 is turned on during a time interval when the delayed region identification signal DRIS remains at a high logic, thereby discharging the voltage signal V73 charged in the first capacitor C1 into the ground voltage source. As the control switch SW1 is switched by the delayed region identifications signal DRIS, a voltage signal V73 as shown in FIG. 7 emerges at the first node 73. The second EOX gate 74 compares a logical value of the region identification signal RIS from the input line 71 with that of the delayed region identification signal DRIS from the second delay 72 to detect the rising edge and the falling edge of the region identification signal RIS. Also, the second EOX gate 74 generates edge pulses having a width corresponding to a delay time of the second delay 72 at the rising and falling edges of the region identification signal RIS. The AND gate 76 makes an AND operation of the edge pulses from the second EOX gate 74 and the region identification pulse RIS to detect rising edge pulses, and applies the detected rising edge pulses to the second control switch SW2 as a switching control signal SWC. The second control switch SW2 responds to the switching control signal SWC from the AND gate 76 to transfer the voltage signal V73 at the first node 73 to the second node 75 only during a time interval corresponding to the delay time of the second delay 72 from the start time of the ID region. Accordingly, the second capacitor C2 receives the voltage signal V73 at the first node 73 during a time interval corresponding to the delay time of the second delay 72 from the start time of the ID region and keeps it until the start time of the next ID region. By the second capacitor C2, an integrated signal V75 as shown in FIG. 7 emerges at the second node 75.

Figure 9:
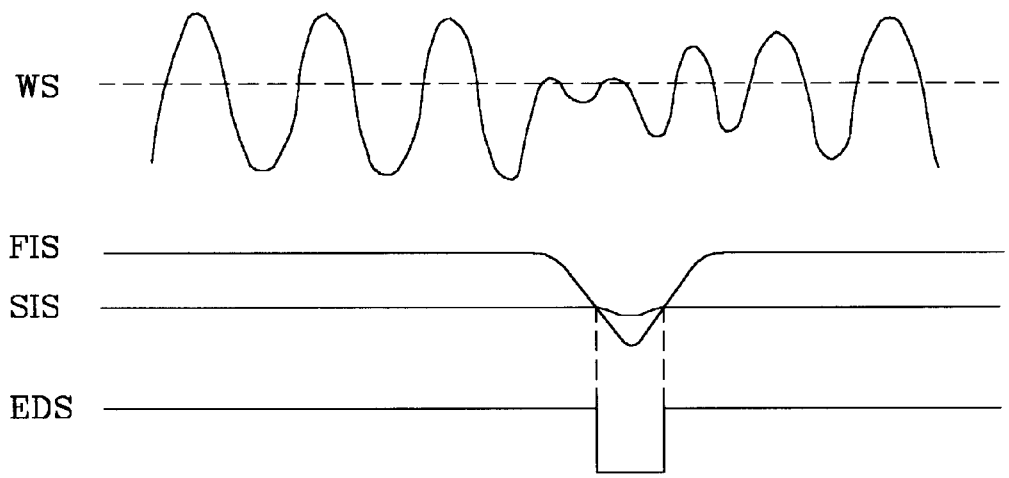
FIG. 9 is input/output waveform diagrams of each part of the envelop detector shown in FIG. 8.

FIG. 8 shows a detailed circuit of an embodiment of the envelop detector 56 in FIG. 2. In FIG. 8, the envelop detector 56 includes first and second diodes D1 and D2 for commonly receiving a wobbling signal WS as shown in FIG. 9 from an input line 81. The first diode D1 and the second diode D2 provide a half-wave rectification of the wobbling signal WS. The wobbling signal half-wave rectified by means of the first diode D1 is applied to the third node 83, and the wobbling signal half-wave rectified by means of the second diode D2 is applied to the fourth node 85.

The envelop detector 56 further includes a third resistor R3 and a third capacitor C3 connected, in series, between the third node 83 and the ground voltage source GND, a fourth resistor R4 connected between a fourth node 85 and the inverting terminal(−) of the comparator 80, and a fourth capacitor C4 and a fifth resistor R5 connected, in parallel, between the inverting terminal(−) of the comparator 80 and the ground voltage source GND. The third resistor R3 and the third capacitor C3 consisting of the first RC integrator integrates the wobbling signal half-wave rectified by the first diode D1 and applies the integrated signal FIS, hereinafter referred to as "first integrated signal", to the non-inverting terminal(+) of the comparator 80. The fourth and fifth resistors R4 and R5 and the fourth capacitor C4 consist of the second RC integrator, and which voltage-divides and integrates the wobbling signal half-wave rectified by the second diode D2 and applies the voltage-divided and integrated signal SIS, hereinafter referred to as "second integrated signal, to the inverting terminal(−) of the comparator 80. A time constant $R3 \times C3$ of the first RC integrator is set to have a very smaller value than a time constant $C4(R4/(R4+R5))$ of the second RC integrator so that the first integrated signal FIS responses at a very faster speed than the second integrated signal SIS with respect to the wobbling signal WS. The time constant $C4(R4/(R4+R5))$ of the second RC integrator is set to have almost the same value as a period of the wobbling signal so that the second integrated signal SIS does not almost change. Accordingly, the first integrated signal FIS drops suddenly as shown in FIG. 9 when the wobbling signal WS does not exist temporarily due to a defect in the optical disc 18. On the other hand, the second integrated signal SIS has a constant voltage even when the wobbling signal WS does not exist temporarily. As a result, the second integrated signal SIS has a higher voltage level than the first integrated signal FIS when the wobbling signal WS does not exist temporarily. Then, the comparator 80 compares the first integrated signals FIS with the second integrated signal SIS to generate an envelop detecting signal EDS as shown in FIG. 9. This envelop detecting signal EDS is applied, via the OR gate 58 in FIG. 2, to the controlling integrator 32, thereby allowing the controlling integrator 32 to perform a hold operation during a time interval when the wobbling signal WS is not detected at the land and groove tracks 12 and 10 due to the defect. As a result, the recording clock channel SCLK can be stabbly generated and the rotation speed error signal can be accurately detected.

As described above, the recording/reproducing apparatus for an optical recording medium according to the present invention detects a frequency band of the wobbling signal being picked up from the wobbled part in the recording medium and varies a filtering frequency band of the BPF into the detected frequency band, so that it can detect the wobbling signal accurately. Accordingly, the present recording/reproducing apparatus can detect the wobbling signal accurately even when a rotation speed of the disc departs from a reference speed, thereby performing recording operation and a rotation speed control stabbly.

Also, the recording/reproducing apparatus according to the present invention detects the presence of the wobbling signal by means of the envelop detector, so that it can detect a recording clock channel and a rotation speed error by employing the previously detected wobbling signal during a time interval when the wobbling signal is not detected. As a result, according to the present invention, a recording operation and a rotation speed control can be stabbly performed even when the wobbling signal is not detected temporarily due to a defect in the optical disc.

Moreover, the recording/reproducing apparatus according to the present invention is capable of maintaining a rotation speed of the optical disc stabbly even though the accessed land and groove tracks are frequently changed.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of recording and reproducing a recording medium having tracks defined by wobbled grooves, comprising the steps of:

(A) picking up a wobbling signal from a wobbled part in the recording medium;

(B) detecting a frequency of the wobbling signal being picked up from the wobbled part; and (C) controlling a frequency band of filtering means for detecting the wobbling signal in accordance with the detected frequency.

2. The method as claimed in claim 1, wherein the recording medium has a specified identification information every predetermined region, and the step (B) includes detecting the identification information and detecting the frequency of the wobbling signal on a basis of a period of the identification information.

3. The method as claimed in claim 1, wherein the recording medium has a preformatted synchronous pattern every predetermined region, and the step (B) includes detecting the synchronous pattern from the recording medium and detecting the frequency of the wobbling signal on a basis of a period of the synchronous pattern.

4. The method as claimed in claim 1, wherein the recording medium has a speed control information recorded on its specified region, and the step (B) includes detecting the speed control information from the recording medium and detecting the frequency of the wobbling signal on a basis of a period of the speed control information.

5. The method as claimed in claim 1, wherein the step (B) includes generating a recording clock synchronized with the wobbling signal from the filtering means and detecting the frequency of the wobbling signal on a basis of a period of the recording clock.

6. The method as claimed in claim 1, wherein the step (B) includes detecting the frequency of the wobbling signal on a basis of a variable speed mode information assigned by a user.

7. The method as claimed in claim 1, further comprising the steps of:

(D) level-slicing the wobbling signal from the filtering means to generate a second wobbling signal in a rectangular wave shape;

(E) detecting an edge portion of the second wobbling signal to generate an edge detecting signal;

(F) comparing a phase of the edge detecting signal with that of a recording clock to generate a phase error signal;

(G) integrating the phase error signal;

(H) generating the recording clock having a frequency varied depending on a voltage level of the integrated phase error signal; and (I) responding to the recording clock to record an information on the recording medium.

8. The method as claimed in claim 7, wherein the step (E) includes:

delaying the wobbling signal; and generating an edge detecting signal having a width corresponding to a delay amount of the delayed wobbling signal every edge portion of the wobbling signal.

9. The method as claimed in claim 7, wherein the step (G) includes:

detecting whether or not the wobbling signal exists in an output signal of the filtering means and generating an integration control signal according to the detected result; and selectively performing any one of integration and hold operations of the phase error signal in accordance with the integration control signal.

10. The method as claimed in claim 7, further comprising the steps of:

(J) generating the reference signal;

(K) comparing a phase of the reference signal with that of the recording clock to detect an error amount in a speed at which a track in the recording medium is played; and (L) responding to the speed error amount to control a playing speed of the track.

11. An apparatus of recording and reproducing a recording medium having tracks defined by wobbled grooves, comprising:

a pickup for picking up a signal from the recording medium;

frequency detecting means for detecting a frequency of a wobbling signal picked up from a wobbled part in the recording medium by the pickup;

filtering means for filtering an output signal of the pickup to detect the wobbling signal; and a filter controller for responding an output signal of the frequency detecting means to control a filtering frequency band of the filtering means.

12. The apparatus as claimed in claim 11, wherein the recording medium has a specified identification information every predetermined region, and the frequency detecting means detects the identification information from the output signal of the pickup and detects the frequency of the wobbling signal on a basis of a period of the identification information.

13. The apparatus as claimed in claim 11, wherein the recording medium has a preformatted synchronous pattern every predetermined region, and the frequency detecting means detects the synchronous pattern from the output signal of the pickup and detects the frequency of the wobbling signal on a basis of a period of the synchronous pattern.

14. The apparatus as claimed in claim 11, wherein the recording medium has a speed control information recorded on its specified region, and the frequency detecting means detects the speed control information from the output signal of the pickup and detects the frequency of the wobbling signal on a basis of a period of the speed control information.

15. The apparatus as claimed in claim 11, wherein the frequency detecting means generates a recording clock synchronized with the wobbling signal from the filtering means and detects the frequency of the wobbling signal on a basis of a period of the recording clock.

16. The apparatus as claimed in claim 11, wherein the frequency detecting means detects the frequency of the wobbling signal on a basis of a variable speed mode information assigned by a user.

17. The apparatus as claimed in claim 11, further comprising:

a level slicer for level-slicing the wobbling signal from the filtering means to generate a second wobbling signal in a rectangular wave shape;

an edge detector for detecting an edge portion of the second wobbling signal to generate an edge detecting signal;

a first phase comparator for comparing a phase of the edge detecting signal with that of a recording clock to generate a phase error signal;

means for integrating the phase error signal;

a voltage controlled oscillator for generating the recording clock having a frequency varied depending on a voltage level of the integrated phase error signal; and a recording information processor for responding to the recording clock to record an information on the recording medium.

18. The apparatus as claimed in claim 17, wherein the edge detector includes:

a delay for delaying the wobbling signal; and a logical element for generating an edge detecting signal having a width corresponding to a delay amount of the delayed wobbling signal every edge portion of the wobbling signal.

19. The apparatus as claimed in claim 17, wherein the integrating means includes:

an envelop detector for detecting whether or not the wobbling signal exists in an output signal of the filtering means and generating an integration control signal according to the detected result; and a controlling integrator for selectively performing any one of integration and hold operations of the phase error signal in accordance with the integration control signal.

20. The method as claimed in claim 17, further comprising:

a fixed oscillator for generating the reference signal;

a second comparator for comparing a phase of the reference signal with that of the recording clock to detect an error amount in a speed at which a track in the recording medium is played; and speed control means for responding to the speed error amount to control a playing speed of the track.

* * * * *